United States Patent [19]
Ibe et al.

[11] Patent Number: 4,823,218
[45] Date of Patent: Apr. 18, 1989

[54] BALANCE COMPENSATED ROTARY MAGNETIC HEAD DEVICE

[75] Inventors: Makoto Ibe; Masanori Kochi, both of Katsuta, Japan

[73] Assignee: Hitachi, Ltd., Tokyo, Japan

[21] Appl. No.: 92,573

[22] Filed: Sep. 3, 1987

[30] Foreign Application Priority Data

Sep. 3, 1986 [JP] Japan .................................. 61-205991

[51] Int. Cl.⁴ ........................... G11B 5/02; G11B 5/52
[52] U.S. Cl. .................... 360/104; 360/130.24
[58] Field of Search ................. 360/84, 104, 107, 108, 360/130.24

[56] References Cited

U.S. PATENT DOCUMENTS

| | | | |
|---|---|---|---|
| 3,207,517 | 9/1965 | Tanigawa et al. | 360/107 X |
| 4,031,558 | 6/1977 | Kusaka | 360/108 X |
| 4,319,294 | 3/1982 | Repp | 360/107 |

FOREIGN PATENT DOCUMENTS

| | | | |
|---|---|---|---|
| 59-119505 | 7/1984 | Japan | 360/104 |
| 60-117402 | 6/1985 | Japan | 360/104 |
| 60-129904 | 7/1985 | Japan | 360/130.24 |
| 61-177617 | 8/1986 | Japan | 360/104 |

Primary Examiner—John H. Wolff
Attorney, Agent, or Firm—Antonelli, Terry & Wands

[57] ABSTRACT

A rotary magnetic head device including a fixed cylinder and a rotary cylinder having a tape guide face on the outer peripheries for enabling running of a tape thereon. At least one magnetic head is installed on the rotary cylinder and a first conductive member is electrically connected with at least one coil of the magnetic head. A head connector is installed on the rotary cylinder and includes a second conductive member electrically connected to the first conductive member with at least one unbalance compensating weight being mounted on the head connector for enabling the magnetic and the head connector to be balance with respect to an axis of the rotary cylinder when the head connector is installed on the rotary cylinder.

9 Claims, 3 Drawing Sheets

BALANCE COMPENSATED ROTARY MAGNETIC HEAD DEVICE

BACKGROUND OF THE INVENTION

The present invention relates to a rotary magnetic head device for recording and playback device such as video tape recorder and the like.

The rotary magnetic head device comprises a fixed cylinder fixed on a shaft of motor, a rotary cylinder fixed on the shaft through a rotary disk, a magnetic head for recording and reproducing a video signal which is fixed on the rotary cylinder, and a transformer for transmitting signals which is disposed between both cylinders.

Mounting the magnetic head on the rotary cylinder may involve a problem that weight is unbalanced to the center of a rotation axis of the rotary cylinder due to misalignment by these assemblies, unevenness in density of material and the like. If weight becomes unbalanced, a centrifugal force is generated from turning the rotary cylinder, and thus vibration may result. The problem cannot be neglected particularly for the cylinder of miniature and light-weight construction. Now, therefore, a proper aperture is provided on the rotary cylinder and others hitherto, thereby lightening the unbalance in weight of the rotary cylinder.

However, as shown in FIG. 1, for example, in case two video heads 3 are disposed on a rotary cylinder 1 symmetrically with reference to the shaft center of the rotary cylinder 1, or at intervals of turning angle of 180°, and further one erase head 10 is mounted at a position 90° in angle of rotation from the two video heads 3, an initial unbalance of the rotary cylinder 1 is heavy, and the aperture provided as above is still not to remove the initial unbalance. Accordingly, as shown in FIG. 1 and FIG. 2, an unbalance compensating weight 8 is mounted generally on the rotary cylinder 1, thereby minimizing the initial unbalance.

The weight 8 is fixed hitherto on the rotary cylinder 1 with a screw 9 or adhesive.

However, as shown in FIG. 3A and 3B, a dislocation of the weight 8 arises longitudinally or horizontally at the time of mounting, thus the initial unbalance cannot be removed thoroughly, and in addition the mounting work is not easy.

SUMMARY OF THE INVENTION

An object of the invention is to minimize an initial unbalance of the rotary cylinder and thus to decrease the cost for unbalance correction work by facilitating a mounting of the weight and also realizing the mounting at high precision.

In order to attain the aforementioned object, the invention relates to a rotary magnetic head device consisting of at least one magnetic head installed on the rotary cylinder, comprising a conductive member for connecting electrically with a coil of the magnetic head, a head connector installing a means for transferring a signal of the conductive member to a signal line installed on the fixed cylinder or a base material supporting the fixed cylinder, at least one unbalance compensating weight mounted integrally with the head connector, and the construction is such that the at least one magnetic head and the head connector will balance the rotary cylinder when the head connector is installed on the rotary cylinder.

DETAILED DESCRIPTION OF PREFERRED EMBODIMENT

Figure 1:
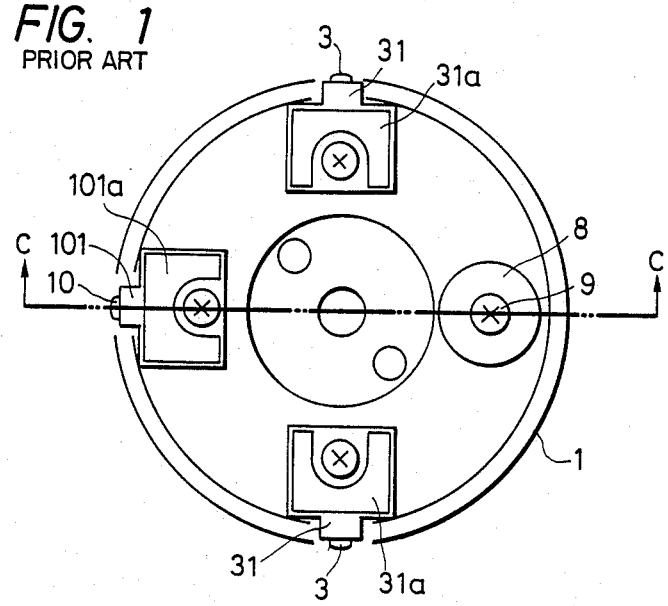
FIG. 1 is a plan view of a prior art rotary head part.
Figure 2:
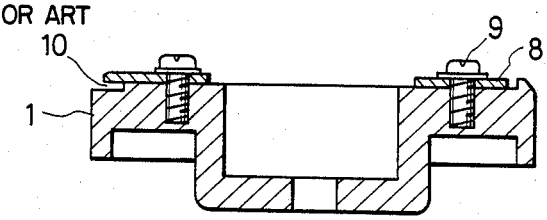
FIG. 2 is a sectional view taken on line C—C of FIG. 1.
Figure 3A:
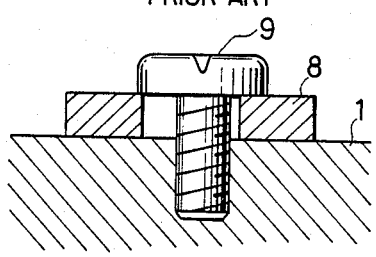
FIG. 3A and FIG. 3B are enlarged views of a main part of FIG. 2.
Figure 3B:
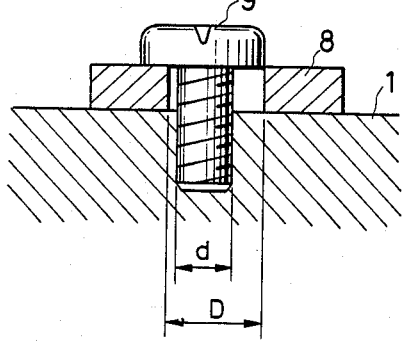
Figure 4:
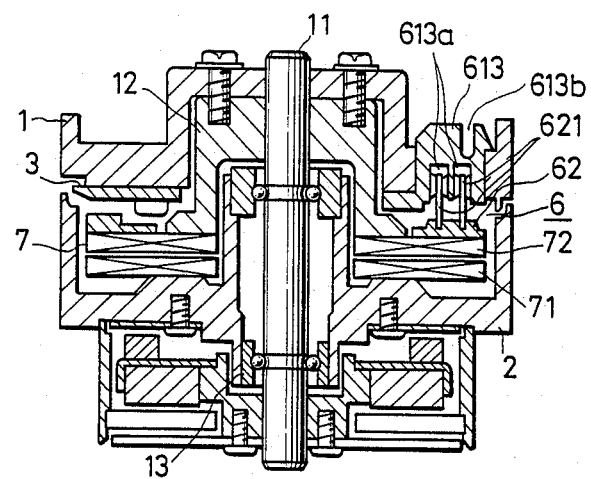
FIG. 4 is a longitudinal sectional view of a rotary magnetic head device given in one embodiment of the invention.
Figure 5:
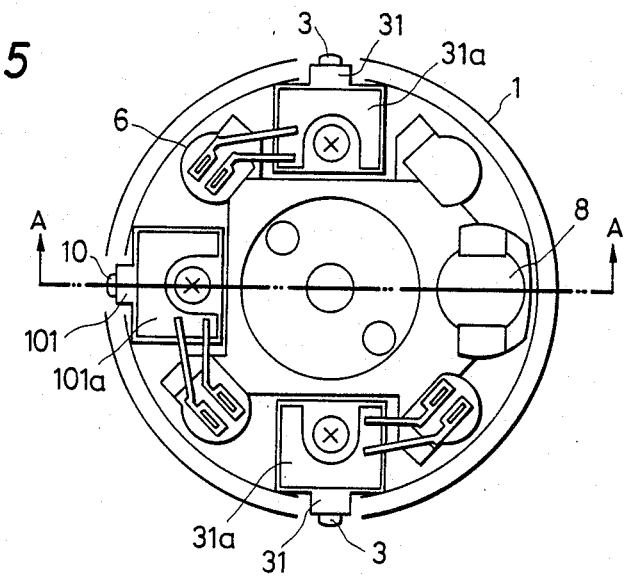
FIG. 5 is a plan view of a rotary cylinder part thereof.
Figure 6:
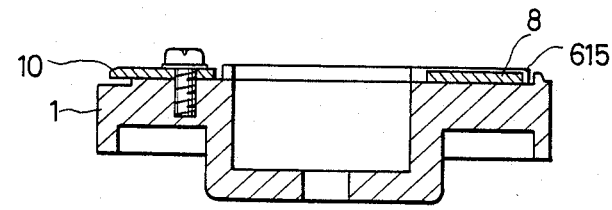
FIG. 6 is a sectional view taken on line A—A of FIG. 5.
Figure 7:
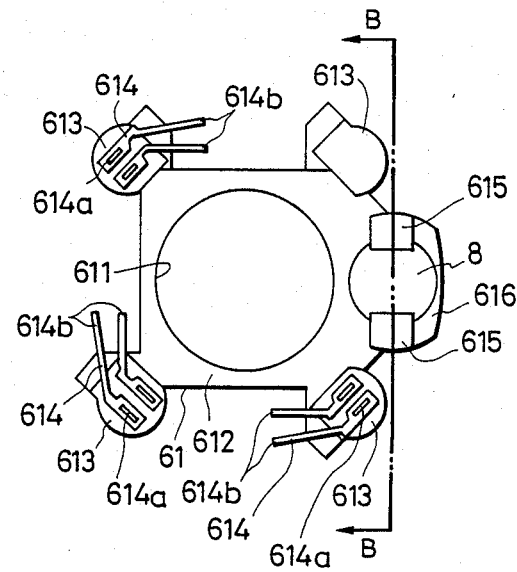
FIG. 7 is a plan view of a head connector according to the invention.
Figure 8:
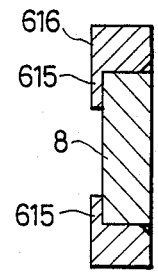
FIG. 8 is a sectional enlarged view taken on a line B—B of FIG. 7.

One preferred embodiment of the invention will now be described with reference to the accompanying drawings. FIG. 4 is a sectional view representing a main part of a rotary magnetic head device given in one embodiment of the invention, and FIG. 5 is a plan view of the rotary cylinder In the drawings, 2 represents a fixed cylinder fixed on a shaft 11 of a motor through a bearing 13, 1 represents a rotary cylinder fixed on the shaft 11 through a rotary disk 12, 3, 3 represent video heads for recording and playback disposed on lower surface peripheral portions of the rotary cylinder 1 symmetrically with reference to the shaft center thereof, or at intervals of turning angle of 180°, 10 represents an erase head disposed at interval of turning angle 90° from the video heads 3, 3, and these heads are fixed on the rotary cylinder 1, as illustrated, through head bases 31, 31, 101 having conductive contact surfaces 31a, 101a. A reference numeral 7 denotes a rotary transformer disposed between the rotary cylinder 1 and the fixed cylinder 2, and the rotary transformer comprises a rotary transformer fixed part 71 mounted on the fixed cylinder 2 and a rotary transformer rotary part 72 mounted on the rotary disk 12 of the rotary cylinder 1. The rotary transformer fixed part 71 and the rotary transformer rotary part 72 are disposed opposite with a predetermined clearance therebetween. A reference numeral 6 denotes a signal connecting device for connecting coils of the heads 3, 3, 10 and coil of the rotary transformer rotary part, and the device comprises a magnetic head connecting board 61 mounted detachably on the rotary cylinder 1 and a rotary transformer connecting board 62 mounted on the rotary transformer rotary part 72. As shown in FIG. 7, the magnetic head connecting board 61 comprises a square insulating base 612 provided with a hole 611 in which a projection of the rotary disk 12 is inserted, and four projections 613 mounted in monoblock formation in the four corners of the base and detachably in four holes provided on the rotary cylinder 1. A slit 613b for giving resilience is formed on the projections. Then, a recession 613a is formed, as shown in FIG. 4, on a rotary transformer side of the projections 613. A connector part 614a of a magnetic head contact 614 is installed in the recession 613a as illustrated therein. A contact part 614b of the magnetic head contact 614 comes in contact, as shown in FIG. 5, with the contact surfaces 31a, 31a, 101a of the head bases 31, 31, 101. Not particularly indicated, but coils of the magnetic heads 3, 3, 10 are connected electrically to the contact surfaces A connection of coils of the magnetic heads 3, 3, 10 with the magnetic head connecting board 61 is performed by soldering the magnetic head contact 614 with the contact surfaces 31a, 101a when the magnetic head connecting board is installed on the rotary cylinder 1. Then, a weight mounting area 616 for mounting the unbalance compensating weight 8 thereon is provided on the base 612 of the magnetic head connecting board 61. The weight mounting area 616 is positioned between the corners of the base 612, or between the projections 613 symmetrically with the erase head 10, and an L-shaped projection 615 for fitting the weight 8 on force and thus preventing it from coming off is provided in the weight mounting area. The weight 8 is pressed in the projection and thus formed integrally with the magnetic head connecting board 61. The weight 8 need not be mounted directly on the rotary cylinder 1 from providing it on the magnetic head connecting board, and moreover, a dispersion in position of the weight is minimized to decrease an initial unbalance, thus facilitating the unbalance correction work and decreasing the number of manufacturing processes.

Further, since a macromolecular material is used for the magnetic head connecting board, which can be formed at high precision including a mounting area of the weight, a dispersion in position of the weight will be minimized and thus the initial unbalance can be decreased, too.

A plug (or contact) 621 to be installed detachably on the connector part 614a of the magnetic head contact 614 is mounted on the rotary transformer connecting board 62. While not so indicated, a coil of the rotary transformer rotary part 72 is connected electrically to the plug.

The rotary transformer connecting board 62 and the magnetic head connecting board 61 are connected by both the contacts 614, 62 coming in contact with each other when the rotary cylinder 1 is mounted on the rotary disk 12.

What is claimed is:

1. A rotary magnetic head device comprising a fixed cylinder and a rotary cylinder coaxial with said fixed cylinder and rotatable about an axis, said fixed cylinder and said rotary cylinder having a tape guide face on the outer peripheries thereof for enabling running of a tape thereon, at least one magnetic head installed on said rotary cylinder, a first conductive member electrically connected with at least one reading and/or writing coil of said at least one magnetic head, a head connector installed on said rotary cylinder and having a second conductive member electrically connected to said first conductive member, and at least one unbalance compensating weight mounted on said head connector for enabling said at least one magnetic head and said head connector to be balanced with respect to the axis of said rotary cylinder when said head connector is installed on said rotary cylinder.

2. The rotary magnetic head device according to claim 1, wherein said at least one unbalance compensating weight enables balancing of a total balance of said rotary cylinder, said at least one magnetic head, and said head connector including said second conductive member and said at least one unbalance, compensating weight mounted thereon.

3. The rotary magnetic head device according to claim 1, wherein said second conductive member is connected to at least one part of a transferring means of a rotary transformer having a fixed part thereof mounted on said fixed cylinder, said rotary transformer having a rotary part thereof mounted on said rotary cylinder and disposed close and opposite to said fixed part.

4. The rotary magnetic head device according to claim 3, further comprising a rotary transformer connector including a third conductive member electrically connected to a coil of the rotary part for contacting said second conductive member when said head connector is installed on said rotary cylinder.

5. The rotary magnetic head device according to claim 1, wherein said first conductive member is connected so as to contact said second conductive member when said head connector is installed on said rotary cylinder.

6. The rotary magnetic head device according to claim 5, wherein said head connector comprises an insulating material having the shape of a square base with projections formed at corners of the base and inserted and fixed in holes of said rotary cylinder, said projections having a recession in which at least part of said second conductive member is installed, and a weight mounting area disposed between the corners of said base having said unbalance compensating weight pressed and fixed therein.

7. The rotary magnetic head device according to claim 1, wherein said head connector comprises an insulated material having the shape of a square base with projections mounted and formed at corners of said base, said base being inserted and fixed in fitting holes of said rotary cylinder.

8. The rotary magnetic head device according to claim 1, wherein said head connector is installed on said rotary cylinder at a position substantially radially opposite said at least one magnetic head with respect to the axis of rotation of said rotary cylinder.

9. A rotary magnetic head device comprising a fixed cylinder and a rotary cylinder coaxial with said fixed cylinder and rotatable about an axis, said fixed cylinder and said rotary cylinder having a tape guide face on the outer peripheries thereof for enabling running of a tape thereon, a plurality of magnetic heads being installed on said rotary cylinder, said rotary cylinder being fixed to a rotary body fixed to the axis of a motor, said fixed cylinder being disposed face-to-face with said rotary cylinder and being fixed to a bearing means of said motor, said plurality of magnetic heads installed on said rotary cylinder including first and second magnetic heads disposed apart by about 180° of angular distance, and a third magnetic head disposed apart by predetermined angular distances with respect to said first and second magnetic heads, head bases for respectively holding said first, second and third magnetic heads and each having a contact surface of a conductive member electrically connected to a respective head coil, a rotary transformer disposed on said fixed cylinder and said rotary cylinder and including a fixed part fixed to said fixed cylinder and a rotary part fixed to said rotary cylinder and disposed close to and face-to-face with said fixed part, an insulating member mounted on said face to said rotary cylinder and including a plurality of contact fixing parts each disposed close to said base, respectively, and a weight fixing part disposed apart by about 180° of angular distance from said third magnetic head, a plurality of first contact members fixed to said contact fixing parts of said insulating member and having end parts which ones in contact with said contact surfaces of said conductive members of said head bases, a plurality of second contact members installed on said rotary part of said rotary transformer and having end parts which come in contact with said first contact members, a weight for compensating an unbalance of said rotary cylinder mounted integrally to said weight fixing part of said insulating member, said plurality of magnetic heads and said rotary transformer being electrically connected by said first and second contact members and said compensating weight compensating an unbalance of said rotary cylinder when said insulating member is mounted on said rotary cylinder.

* * * * *